United States Patent

[11] 3,560,807

| [72] | Inventors | Ernest N. Urfer;<br>Henry F. Puppolo, North Adams, Mass. |
|---|---|---|
| [21] | Appl. No. | 802,016 |
| [22] | Filed | Feb. 25, 1969 |
| [45] | Patented | Feb. 2, 1971 |
| [73] | Assignee | Sprague Electric Company<br>North Adams, Mass.<br>a corporation of Massachusetts |

[54] MULTI-SHOT VOLTAGE SENSITIVE SWITCH ASSEMBLY
4 Claims, 5 Drawing Figs.

[52] U.S. Cl. .................................................. 317/231,
317/258, 317/242
[51] Int. Cl. ........................................................ H01g 1/16
[50] Field of Search ............................................ 317/230,
231, 233

[56] References Cited
UNITED STATES PATENTS

| 965,992 | 8/1910 | Dean | 317/242X |
|---|---|---|---|
| 1,835,267 | 12/1931 | Bradley | 317/242X |
| 2,138,892 | 12/1938 | Strab | 317/242X |

*Primary Examiner*—James D. Kallam
*Attorneys*—Connolly and Hutz, Vincent H. Sweeney, James Paul O'Sullivan and David R. Thornton ABSTRACT: A multishot voltage-sensitive switch is provided by a solid state device consisting of a thin film dielectric sandwiched between an electrode and a thin film counterelectrode. The switch closes upon the application of a voltage in excess of a rated voltage and is cleared by application to the switch of a high current, low voltage pulse.

PATENTED FEB 2 1971

3,560,807

3,560,807

MULTI-SHOT VOLTAGE SENSITIVE SWITCH ASSEMBLY

BACKGROUND OF THE INVENTION

The present invention relates to a protective device for an electrical component or circuit and more particularly, to a multishot voltage-sensitive switch which is connected by leads and which closes a circuit between these leads when the voltage at the leads reaches or exceeds a predetermined value while holding the circuit open so long as the voltage is lower. Single-shot switches of this type are described in US U.S. Pat. Nos. 2,909,122 granted Oct. 20, 1959, 2,986,660 granted May 30, 1961, 3,412,220 granted Nov. 19, 1968 (Puppolo, Scherr) as well as in a paper by Otley et al. in the Proceedings of the IRE Vol. 46, pages 1723—30 (1958).

The switches described in the above citations have the basic structure of a capacitor since they comprise two conductive layers separated by a dielectric. Unlike a capacitor however, these units function once only requiring replacement with each activation.

Other devices have been proposed which provide plural responses using the above capacitor configuration. These devices essentially provide for the joining of a plurality of switches, each switch as it is used being succeeded by the next switch in line. This type of multiple switch is limited, as to the number of times it can function, by space requirements and is expensive in construction.

It is therefore the general object of the present invention to provide a relatively inexpensive voltage sensitive switch which can be reset after each use and hence function as a multishot switch.

It is a further s object to provide such a switch which is not appreciably larger than the present single shot switches.

SUMMARY OF THE INVENTION

Broadly, this invention a describes a voltage protection switch having a capacitor structure whose dielectric under suitably high voltage conditions, breaks down and becomes conductive and more particularly, to such a switch which can be sued repeatedly by "clearing" the switch after each breakdown.

The present invention comprises, in combination, a switch comprising an aluminum foil electrode, an aluminum oxide layer anodically formed on said surface, said oxide having a plurality of impurity originating closure sites and a thin counterelectrode formed on the oxide layer together with means for applying a high current, low voltage pulse to said counterelectrode. The closure of or shorting of this switch results from oxide film breakdown at one or more preferential closure sites upon application of a voltage pulse above the rated value. The switch is then cleared by applying a high current, low voltage pulse across the counterelectrode. This current is sufficient to remove the counterelectrode contact to the shorted site or sites thereby effectively removing the short. Although the site itself is not repaired, there are still additional cathode-contacted sites available to serve as subsequent shorting paths.

The switch, besides protecting a circuit or component, can also be used in conjunction with current sensitive circuit breakers or fuse wires to completely disengage a power source. When used in its primary protective capacity, the switch has characteristics which "follow" those of the circuit or component thereby enhancing its effectiveness For example, for high voltage transients the switch response time increases; for temperatures increases the closure voltage required becomes somewhat less.

DESCRIPTION OF THE INVENTION

Figure 1:
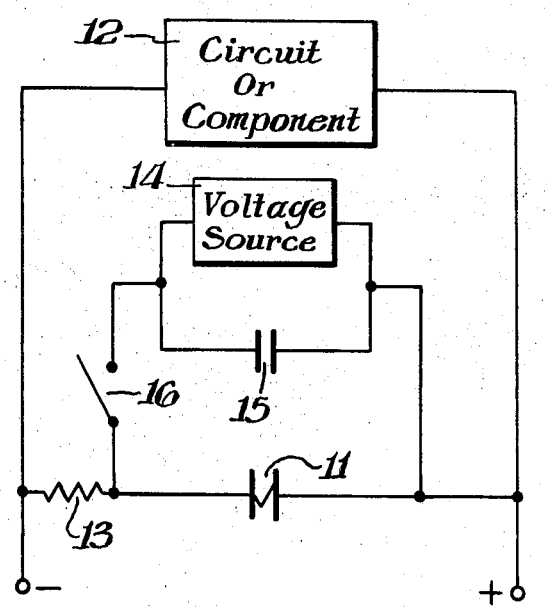
FIG. 1 is a circuit diagram of the invention.

FIG. 1 is a circuit diagram of one embodiment of the invention. The multishot voltage-sensitive switch 11 is in parallel with a circuit or component 12 which it is desired to protect. A current limiting resistor 13 is in series with the switch. A voltage source 14 with a capacitor 15 in parallel are connected to switch 11 when switch 16 is closed. Under open (normal) conditions, the voltage switch 11 presents a very high impedance to the input signal and the circuit remains open. Should a voltage surge occur above the closure voltage of the switch, the switch will short, causing its resistance to drop to a very low value and insuring that the input will be shorted across it rather than circuit or component 12. To clear the short, switch 16 is closed. The accumulated charge, at a low voltage, from capacitor 15 is released sending a high current pulse into the switch. Upon the opening of switch 16, the clearing circuit is again placed in its open sa state.

Figure 2:
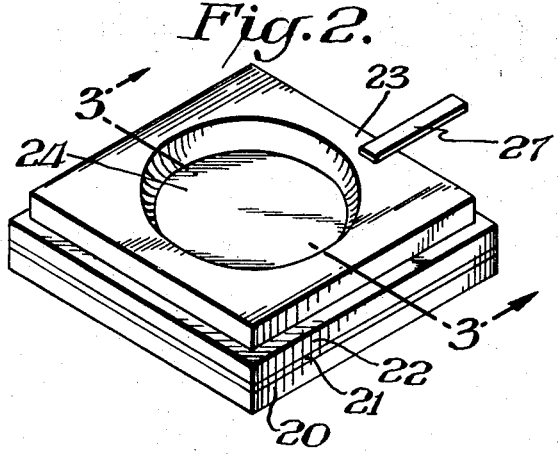
FIG. 2 is a perspective view of the preferred embodiment of the voltage sensitive switch.
Figure 3:
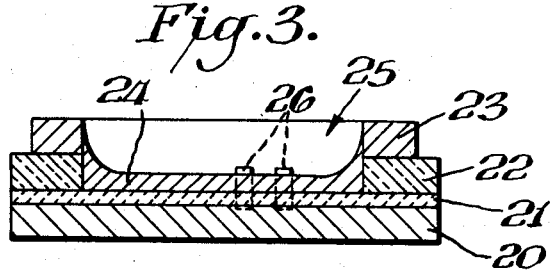
FIG. 3 is a cross-sectional view through line 3—3 of FIG. 2.

Referring now to FIGS. 2 and 3, there is illustrated a perspective and cross-sectional view of switch 11. The switch comprises an aluminum base electrode 20 having an aluminum oxide dielectric 21 formed thereon. Insulating layer 22 is placed on the dielectric surface, tin thin metal film 23 is placed on the surface of layer 22 and a metal counterelectrode 24 is applied to the aluminum oxide through a contact area 25 made through the metal film and insulator, Located in the surface of the aluminum electrode are a plurality of impurity originating closure sites 26. Lead 27 is connected to film 23 to form the negative connection while the positive lead (not shown) can be connected to the aluminum electrode at a desired location.

The selection and preparation of electrode 20 and the production and control of its oxide 21 are described fully in Pat. No. 3,412,220 and copending application 745,879. The former reference contains further information regarding regulation of the anodization time and voltage to control voltage breakdown point; the latter reference contains a method for determining the presence or absence of at least one closure site and said method is likewise suitable for insuring that the aluminum foil used as the electrode in the present invention contains a substantial number of such sites.

Insulator 22 and film 23 are formed by securing a thin copper film to a laminated plastic sheet, both copper and plastic being trimmed to the requisite dimensions. An aperture is then formed through the combined layers, the area removed corresponding to the area the counterelectrode is to occupy. The cored combination is then secured to the surface of the oxide 21. The counterelectrode, silver in the present embodiment, is formed by a painting or injecting the silver into area 25 so as to contact both the dielectric 21 and the copper film as shown in FIG. 3.

A feature of the invention is the method of attaching the negative lead to the counterelectrode. In the above referenced Pat. No. 3,412,220 and application 745,879, a relatively massive contact to the counterelectrode is made by the negative lead connection. It has been found that if shorted sites occur beneath this contact, they cannot be subsequently cleared. It is therefore desirable to attach the negative lead so as to make minimum contact with the counterelectrode. This is accomplished in the present invention by attaching the lead to the copper film which, in turn, makes minimal contact along the edges of the counterelectrode. This leaves the surface of the counterelectrode open and all closure sites available for use.

The operation of the circuit of FIG. 1 is as follows. Assume that electrode 20 comprises a 3 mil aluminum foil of 99.99 percent purity and known to contain impurities which will result in development of closure sites. The foil is electropolished as described in the previous references and then anodized in a 1.5 percent chromic acid electrolyte at 38° C at 1 ma/sq. cm. for a period of about 5 minutes followed by a second anodization in 0.1 percent ADP (ammonium dihydrogen phosphate at 85° C for 4 ½minutes). After drying, insulator 22 and film 23 are secured to the s oxide layer by a high temperature adhesive and conductive film 24 about 0.0002 inches thick and with an area of 0.039 sq.cm. is applied within depression 25 as previously described. This unit, when used as switch 11 in FIG. 1 and with a resistor 13 value of 50 ohms, has a nominal initial closure voltage of 14.5 volts.

Figure 4:
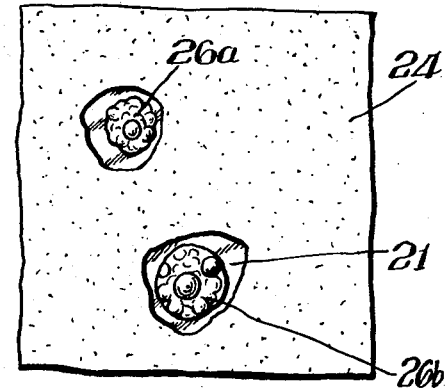
FIG. 4 shows a magnified view of a portion of the switch surface after application of a clearing pulse following a short.

Assume also that a voltage exceeding 14.5 volts has caused a breakdown of the oxide at one or more closure sites resulting in a conductive path from the counterelectrode across the oxide to the electrode at these sites. The resistance of the switch is dramatically reduced and the high voltage pulse is dissipated through the switch. The circuit can now be returned to its open state by providing a clearing pulse to the switch. In FIG. 1, voltage source 14 is a 10 volt bar battery and capacitor 15 has a value of 270 $\mu f$. Upon closing of switch 16, the capacitor is discharged providing a high current pulse which is limited only by the closed resistance of the multishot switch and which causes removal, by evaporation, of the portions of the counterelectrode around the shorted sites thereby clearing the short. FIG. 4 shows a portion of the surface of the switch showing the location of two breakdown sites. Shorts 26a and 26b represent closure sites which originally shorted the counterelectrode to the electrode Although the sites still exist, there is no effective contact to them, hence the, short which occurs following the next overvoltage pulse will occur across a new site or set of sites. Although it is believed that the closure sites are cleared by evaporation of the area of the electrode in the immediate area of the site, in some cases clearing may result from the counterelectrode "pulling away" from a shorted site.

It is, of course, understood that the switch can be made to break down at voltages other than indicated above by varying the anodizing times or voltages, or by using different concentrations of solute in the anodizing baths. Shortening the times or voltages, or making the baths more dilute will provide switches that break down at as little at 10 volts. On the other hand, lengthening the times or increasing anodizing voltages will give switches that break down at voltages anywhere up to 100 volts or even higher.

While the circuit operation has been described in terms of shorting across a pair of sites, there may be one or a plurality of sites involved in each closure depending upon the current accompanying the closure voltage. A closure tat carries high current requires more sites than one that carries low current. The value of resistor 13 affects the number of closures a switch is capable of, i.e., high values of this resistor allow considerably more shots than low values. In most cases the maximum current output of the source voltage will dictate a maximum resistance value that can be tolerated while still insuring voltage protection to a circuit or component. Another obvious method of increasing the number of available shots is to increase the counterelectrode area. However, because the number of sites used per closure is increased, an increase in area does not result in the proportionate increase in the number of closures per device.

It has also been found that, with repeated closures, the closure voltage required increase slightly, i.e., from 14.5 to 16.5 volts during 500 shots for the above sample. However, every closure was not higher than the preceding one probably due to the fact that the process of shorting and clearing can produce some small damage to surrounding closure sites resulting in a lower s closure. This t si the principle reason for the fairly high clearing voltage of 10 volts.

Figure 5:
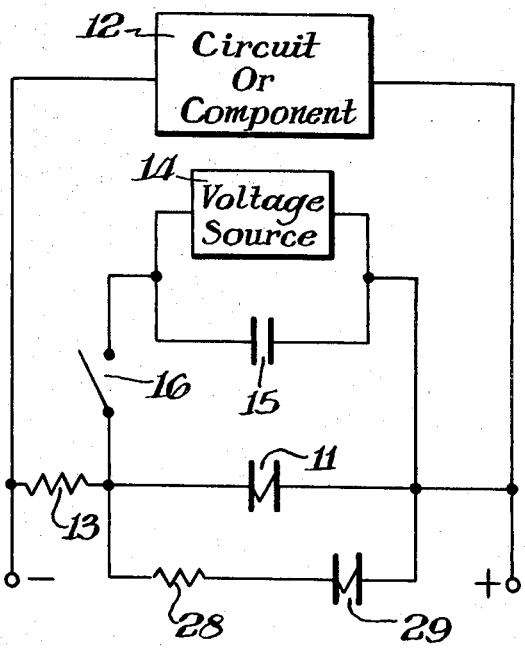
FIG. 5 shows a circuit diagram of an alternate embodiment of the invention.

FIG. 5 shows a circuit of an alternate embodiment wherein a multishot or single-shot voltage sensitive switch switch 29 and a cure current limiting resistor 28 are in parallel with multishot switch 11. Switch 29 insures that the protective circuit will fail "short" when the multishot feature of switch 11 has been completely used or the closure voltage has increased to an undesirably high value. For the example given above, a switch 29 rated at 20 volts breakdown and a resistor 28 of 10 ohms will be shorted only after switch 11 no longer provides a shorting path of has increased to a closuAre voltage above 20 volts. A visual indicator A(not shown) can be cone cAonnected to switch 29 so as to warn that multishot switch 11 must be replaced. If a single-shot switch 29 is used, Ait can be formed as described in Pat. No. 3,412,220.

While only a single clearing means has been described above, it is understood that any apparatus which provides a high current pulse can be used. And while the clearing pulse has been manually introduced to the switch, automatic clearing means by means of a reed switch or relay may be employed.

Since it is obvious that many changes and modifications can be made in the above-described detail without departing from the nature and spirit of the invention is not limited to said details except as set froth in the appended claims.

We claim:

1. A multishot, voltage-sensitive switch assembly for protecting a circuit or component against voltages in excess of rated values comprising:

A voltage-sensitive switch having base and counterelectrodes separated by a dielectric, said dielectric including means at a plurality of locales, for forming closure sites susceptible to dielectric breakdown upon overvoltage conditions and preferentially for forming a conductive path between said electrodes at at least one of said closure sites upon dielectric breakdown thereof; electrical means for applying between said electrodes of the switch following dielectric breakdown to remove the conductive paths between the electrodes and means for initiating said electrical means after a dielectric breakdown occurs and for removing said electrical means after "clearing" the conductive paths.

2. A multishot voltage-sensitive switch assembly as described in claim 1 where said electrical means is connected to said switch by one lead in electrical contact to a portion of said base electrode and a second lead in electrical contact with, but not impinging on he the surface of, said counterelectrode.

3. A multishot, voltage-sensitive switch assembly as described in claim 1 and including means for protecting said circuit or component under conditions where said voltage sensitive switch no longer closes at a suitable voltage.

4. A multishot voltage-sensitive switch assembly as described in claim 3 wherein said means for protecting said circuit or component comprise a resistor and a second voltage sensitive switch in parallel with said switch assembly, said switch having a higher breakdown voltages than the first voltage sensitive switch.

UNITED STATES PATENT OFFICE
CERTIFICATE OF CORRECTION

Patent No. 3,560,807                                                February 2,

Ernest N. Urfer et al.

It is certified that error appears in the above identified patent and that said Letters Patent are hereby corrected as shown below:

Column 1, line 19, after "function" insert -- at the volt at which the dielectric breaks down and function --; line 20, "activation" should read -- actuation --; line 33, cancel "s"; 37, cancel "a", first occurrence; line 41, "sued" should read used --; line 49, cancel "of", first occurrence; line 66, "temperatures" should read -- temperature --. Column 2, line 2 cancel "sa"; line 26, cancel "tin"; line 29, "insulatcr," shou read -- insulator. --; line 54, cancel "a". Column 3, line 3, cancel "s"; line 5, "0.0002" should read -- 0.002 --; line 16, cancel "bar"; line 25, "electrode" should read -- electrode. - line 38, "at", second occurrence, should read -- as --; line 4 "tat" should read -- that --. Column 4, line 3, cancel "s"; sa line 3, "t si" should read -- is --; line 6, cancel "switch", second occurrence; line 7, cancel "cure"; line 14, "of" should -- or --; same line 14, "closuAre" should read -- closure --; 15, "A(not shown) can be cone cAon-" should read -- (not shown) can be con- --; line 17, "Ait" should read -- it --; line 26, "detail" should read -- details --; line 28, "froth" should rea -- forth --; line 35, after "means" insert a comma; line 36, be "susceptible" insert -- preferentially --; line 37, cancel "preferentially", and insert the same after "sites" in line 35, same column 4; line 40, after "applying" insert -- current flow line 42, after "electrodes" insert a semicolon; line 50, cancel "he"; line 59, after "said", second occurrence, insert -- second --; line 60, "voltages" should read -- voltage --.

Signed and sealed this 7th day of September 1971.

(SEAL)
Attest:

EDWARD M. FLETCHER, JR.
Attesting Officer

ROBERT GOTTSCHALK
                                         Acting Commissioner of Pa